(12) United States Patent
Grachanen et al.

(10) Patent No.: US 10,406,696 B2
(45) Date of Patent: Sep. 10, 2019

(54) LOCKABLE CONNECTOR DEVICE

(71) Applicant: Hewlett Packard Enterprise Development LP, Houston, TX (US)

(72) Inventors: Christopher L Grachanen, Houston, TX (US); Mary D. Stauffer, Houston, TX (US); Titus D Stauffer, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 320 days.

(21) Appl. No.: 15/319,470

(22) PCT Filed: Jul. 29, 2014

(86) PCT No.: PCT/US2014/048624
§ 371 (c)(1),
(2) Date: Dec. 16, 2016

(87) PCT Pub. No.: WO2016/018254
PCT Pub. Date: Feb. 4, 2016

(65) Prior Publication Data
US 2017/0144315 A1    May 25, 2017

(51) Int. Cl.
*B25J 17/00* (2006.01)
*B25J 17/02* (2006.01)
*B25J 18/00* (2006.01)
*B25J 9/10* (2006.01)
*B25J 19/00* (2006.01)

(52) U.S. Cl.
CPC ......... *B25J 17/0275* (2013.01); *B25J 9/1075* (2013.01); *B25J 19/0004* (2013.01)

(58) Field of Classification Search
CPC ..... B25J 18/06; B25J 9/06; B25J 9/065; B25J 9/1075; B25J 17/0275
See application file for complete search history.

(56) References Cited

U.S. PATENT DOCUMENTS

| 4,315,423 A |   | 2/1982 | McGuire |           |
|-------------|---|--------|---------|-----------|
| 4,397,145 A |   | 8/1983 | Reist   |           |
| 4,634,889 A | * | 1/1987 | Foggia  | B25J 9/12 |
|             |   |        |         | 307/104   |

(Continued)

FOREIGN PATENT DOCUMENTS

| KR | 10-1094866 B1 | 12/2011 |
| KR | 10-1258962 B1 | 4/2013  |
| KR | 10-1405087 B1 | 6/2014  |

OTHER PUBLICATIONS

International Searching Authority, "Notification of Transmittal of the International Search Report and the Written Opinion", PCT/US2014/048624, dated Apr. 16, 2015, 13 pages.

*Primary Examiner* — Jake Cook
(74) *Attorney, Agent, or Firm* — Brooks, Cameron & Huebsch, PLLC

(57) ABSTRACT

A lockable connector device and system is described. An example lockable connector device includes a first spherical body connected to a first end of a shaft and a plurality of appendages connected to a second end of the shaft. The appendages partially encase a second spherical body and an actuator connected to the appendages, where the actuator is comprised of synthetic muscles that compress to lock the second spherical body.

15 Claims, 4 Drawing Sheets

(56) References Cited

U.S. PATENT DOCUMENTS

| | | | |
|---|---|---|---|
| 4,739,241 A * | 4/1988 | Vachtsevanos | B25J 17/0266 310/166 |
| 4,739,692 A * | 4/1988 | Wassam | B25J 9/06 901/21 |
| 4,784,042 A | 11/1988 | Paynter | |
| 5,172,551 A * | 12/1992 | Nakajima | B25J 18/06 60/527 |
| 5,383,738 A * | 1/1995 | Herbermann | B25J 9/06 248/288.51 |
| 6,109,852 A * | 8/2000 | Shahinpoor | A61F 2/08 244/213 |
| 6,296,644 B1 | 10/2001 | Saurat et al. | |
| 8,201,473 B2 | 6/2012 | Knoll | |
| 8,224,485 B2 | 7/2012 | Unsworth | |
| 2002/0003352 A1* | 1/2002 | Portal | B23Q 1/5462 279/3 |
| 2010/0221062 A1 | 9/2010 | Bevirt | |
| 2012/0229237 A1* | 9/2012 | Zhao | B25J 9/1075 335/297 |
| 2012/0253513 A1 | 10/2012 | Unsworth | |
| 2014/0030455 A1* | 1/2014 | Ruschulte | B25J 9/1075 428/35.2 |
| 2015/0093917 A1* | 4/2015 | Stern | B25J 9/065 439/8 |
| 2015/0152852 A1* | 6/2015 | Li | H02N 11/006 60/528 |

* cited by examiner

LOCKABLE CONNECTOR DEVICE

BACKGROUND

Mechanical robotic arms can safely conduct tasks that may be dangerous for human completion. Various tasks can occur in different types of environments, such as aqueous, desert, space, factory, and high/low altitudes, among others. Robotic arm positioning and movement can provide a broad working range for task completion in different environments.

DETAILED DESCRIPTION

Mechanical robotics may operate under manual supervision/control and can be used to complete tasks deemed too complicated or dangerous for humans. Changing the position of an object or a tool in a three dimensional space to a number of alternative positions via a robotic arm can assist humans in completing a variety of tasks while maintaining human safety. Tasks involving hazardous waste, heavy objects and/or tools, dangerous locations, and/or distant exploration missions, among others, can benefit human safety by use of a lockable connector device. Use of a lockable connector device can alleviate aspects of a dangerous task by transferring the danger onto an inanimate object.

In the present disclosure, a lockable connector device is provided. Devices and systems for a lockable connector device that can be firmly fixed into a position via change in temperature, such as heat, are described herein. A lockable connector device can maneuver, re-position, and/or change orientation, yet remain in a firmly fixed position for a period of time. A lockable connector device can be considered a "third hand" to flexibility. For example, a lockable connector device can firmly grasp a tool in a particular orientation within space and/or perform a particular task.

Figure 1:
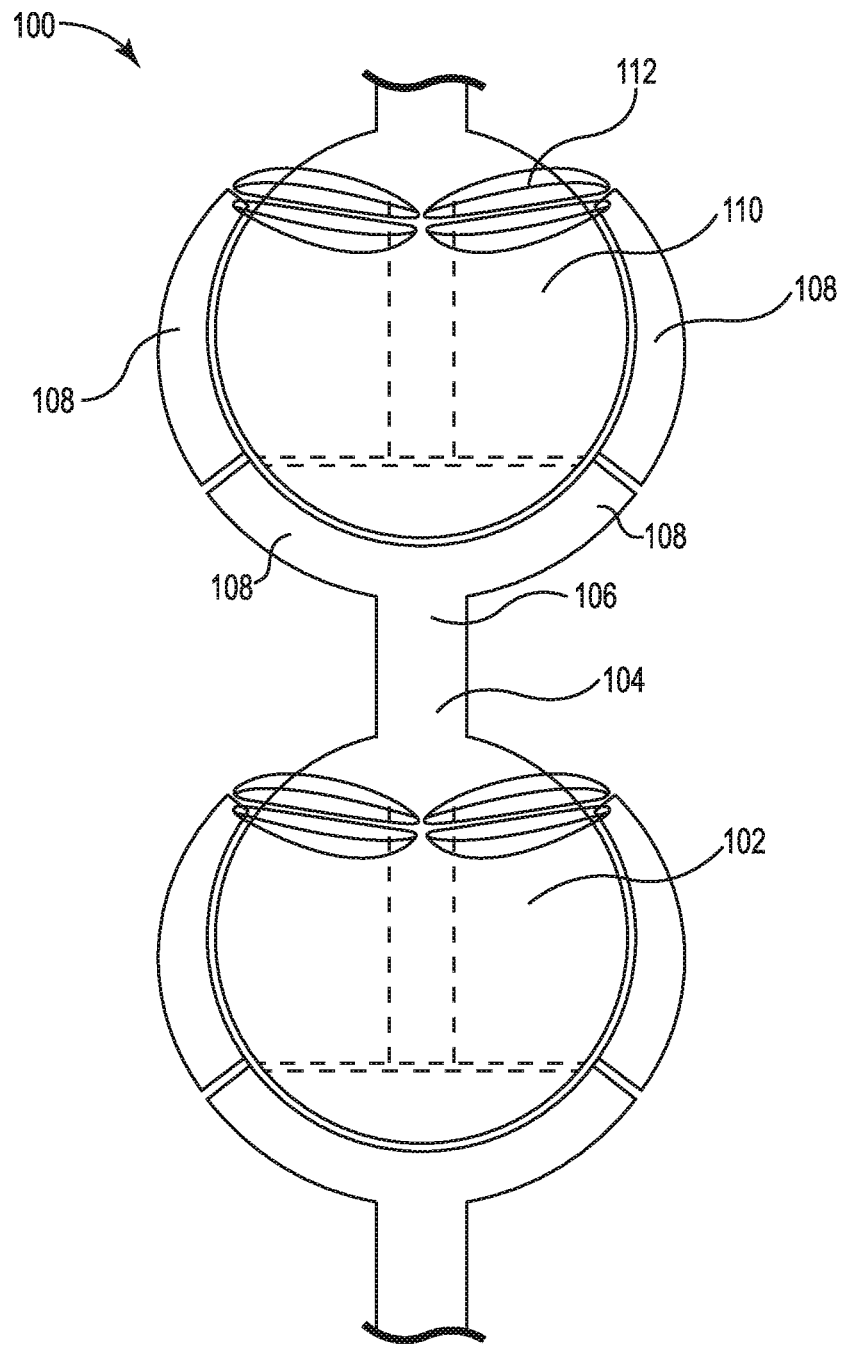
FIG. 1 illustrates an example of a lockable connector device according to the present disclosure.

FIG. 1 illustrates an example of a lockable connector device according to the present disclosure. FIG. 1 includes a first spherical body 102 connected to a first end of a shaft 104. A plurality of flexible appendages 108 connect to a second end of the shaft 106, where the appendages 108 partially encase a second spherical body 110. FIG. 1 also includes an actuator 112 connected to the appendages. The actuator 112 can include synthetic muscles that compress to lock the second spherical body 110.

A spherical body can be a rounded shaped ball in various sizes. When the lockable connector device is not in a fixed position, the spherical bodies 102, 110 can glide and re-position. In some examples, a low friction coating at a base of the appendages 108 can be present to provide easy gliding and/or positioning of the spherical bodies 102, 110. The low friction coating can provide a buffer zone between the second spherical body 110 and the appendages 108. In some examples, appendages 108 are spaced apart, such that each appendage from among the appendages 108 are not in contact. The spaced appendages 108 enable the spherical bodies 102, 110 to rotate within the appendages. That is, the spherical bodies 102, 110 can be positioned and/or repositioned prior to the spherical bodies 102, 110 being locked (e.g., fixed) into a particular position.

In a number of examples, appendages 108 partially encases less than half of the second spherical body 110. That is, the appendages 108 encase a portion of the second spherical body 110 to enable rotation of the second spherical body 110. In some examples, the second spherical body 110 rotates freely when the appendages are not compressed. The rotation of the second spherical body 110 can allow for flexibility and repositioning of the lockable connector device 100.

In some examples, the actuator can be made up of twisted monofilament string. The twisted monofilament string can be attached to the appendages. The twisted monofilament string can be flexible when inactivated, allowing for appropriate positioning. The twisted monofilament string can include an actuator that can be similar to human muscles, and thus can be referred to as "synthetic muscles."

In some examples, the synthetic muscles can compress based on temperature change. For instance, warm air, water, and/or a variable control energized resistors that are thermally coupled to the synthetic muscles and activate the synthetic muscles to constrict. The synthetic muscles can react to the temperature change by compressing, thereby locking the second spherical body 110 into position. The synthetic muscles can decompress when the synthetic muscles are cooled, such as ambient air, cooling water, and/or cooling air. Decompression of the synthetic muscles is unlocking and/or unfixing from a locked/fixed position. That is, decompression can enable the lockable connector device 100 to be repositioned and/or re-maneuvered.

Additionally and/or alternatively in some examples, a sleeve encasement can be placed over the synthetic muscles that can contain spaced air inlet vents within the sleeve encasement. The sleeve encasement can protect the lockable connector device 100 from water, debris, and/or other foreign objects from interfering with the lockable connectors, while providing adequate air ventilation for heat escape. A sleeve encasement can be a type of tube, netting, and/or hose, which can surround the synthetic muscles. In a number of examples, the sleeve encasement can be flexible to enable movement and flexibility of the lockable connector device.

A lockable connector device can include a heavy base to provide stability for the device. The base can be immobile or mobile, such as including wheels or tracks for relocation purposes. In some instances, a lockable connector device can include a strain gauge feedback to protect the lockable connector device and/or grasped tool. That is, a gauge feedback may prevent breakage and/or excessive user force. For example, when forces approach safety limitations, the lockable connector device can disengage so as to prevent excessive force from damaging the lockable connector device structure and/or associated tool.

Figure 2:
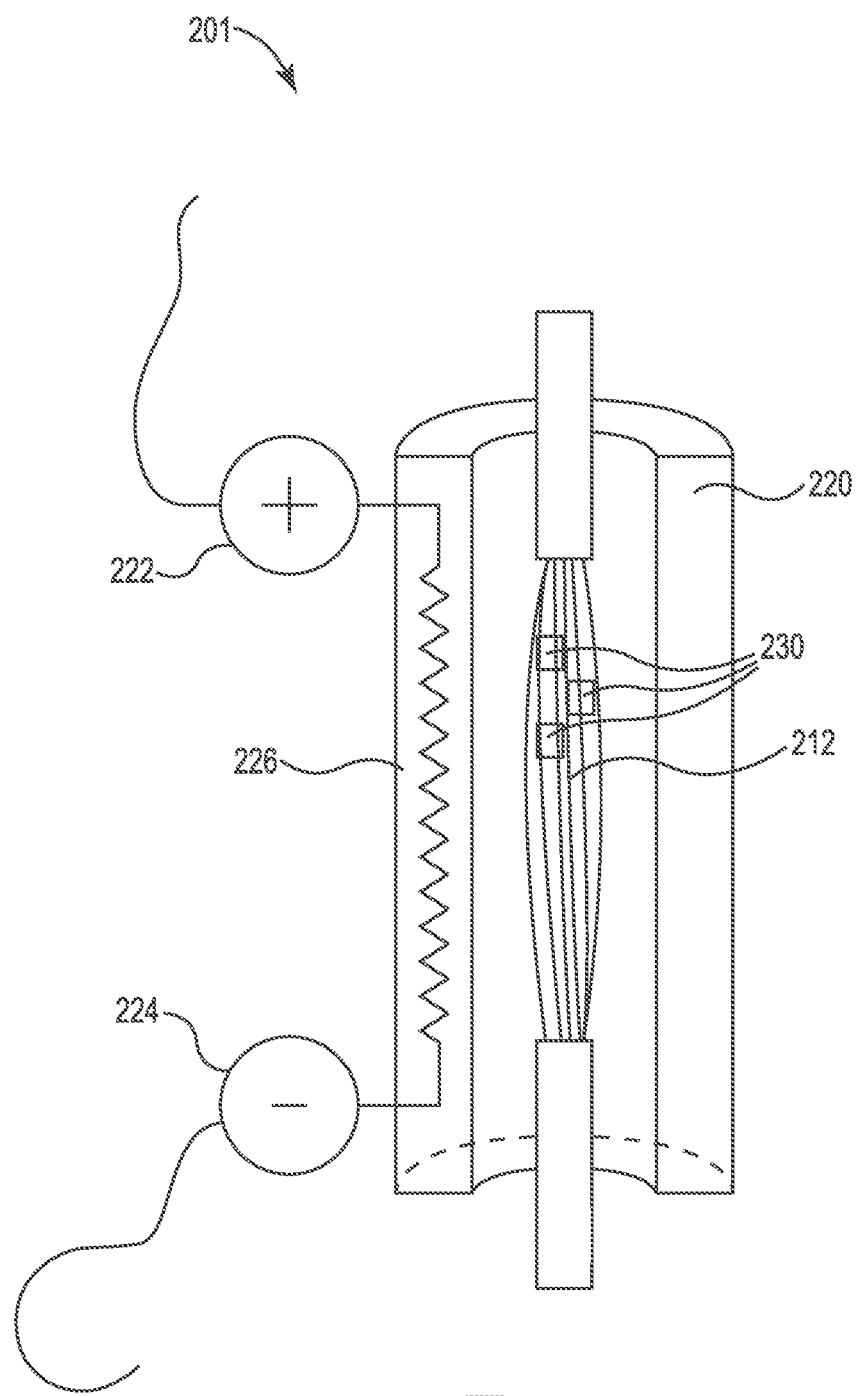
FIG. 2 illustrates an example of an actuator enclosed-resistor according to the present disclosure.

FIG. 2 illustrates an example of an actuator enclosed-resistor according to the present disclosure. In some examples, the lockable connector device 100 can include a number of actuator enclosed-resistors 201. The actuator enclosed-resistor can include resistors 230 that can be attached to the actuator 212 to provide an electrical supply. The actuator 212 can be encased in a hollow resistor 220, such as ceramic, nylon or plastic. The hollow resistor 220 can be differently sized to accommodate different sizes of actuators 212 and a different voltage 226 of the power supply. The hollow inside of the resistor can be large enough to accommodate the synthetic muscles while compressed and decompressed.

The resistors 230 can be glued and/or cable tied to the actuator 212 (e.g., synthetic muscles), or bundled side-by-side. The resistors 230 can provide electrical voltage 226 AC/DC and/or positive current 222 and negative current 224 to the actuator 212 to compress. However, the resistors 230 can provide low-wattage (in terms of wattage per square inch of surface) so that it will not over-heat or melt the synthetic muscles. That is, the attached resistors 230 can provide a heat source for the synthetic muscles to compress.

The actuator enclosed-resistor 201 can include heat-transfer efficiency. The resistor wall can provide a source of heat and/or mechanical protection (e.g., sheath) for the synthetic muscles. Multiple actuator enclosed-resistors 230 can be connected to the lockable connector device to provide a source of heat and power supply for compression purposes.

Figure 3:
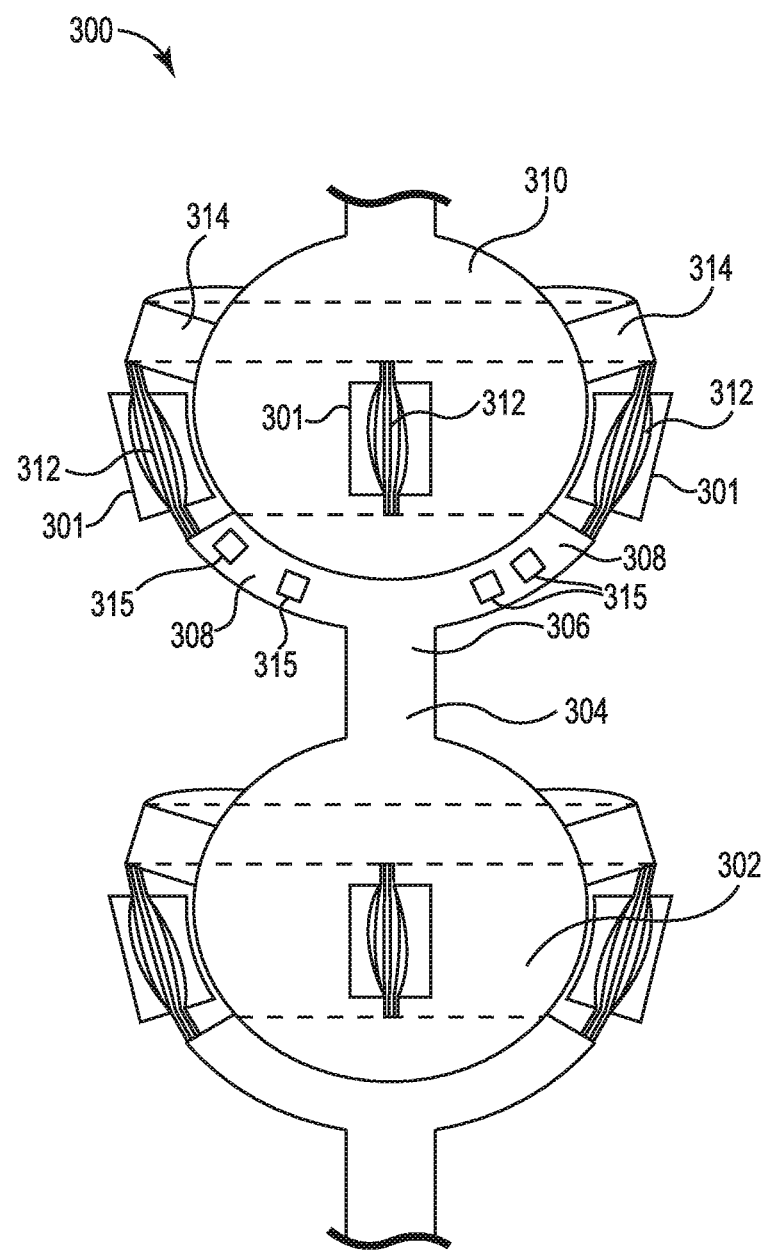
FIG. 3 illustrates an example of a lockable connector device according to the present disclosure.

FIG. 3 illustrates an example of a lockable connector device according to the present disclosure. FIG. 3 depicts a lockable connector device 300 that includes a first spherical body 302 connected to a first end of a shaft 304; a resistor-enclosed actuator 312 connected to a second end of the shaft 306; and a flexible constriction ring 310 attached to the resistor-enclosed actuator 312, where the actuator constricts the resistor-enclosed actuator 312 and constriction ring 310 to lock a second spherical body 310.

In some examples, a number of temperature sensors 315 attached to the appendage 308 to monitor temperature changes. The temperature sensors 315 can detect and monitor temperature changes, which can then send a signal to the appendages to compress. Detection and monitoring of temperature can be in response to water temperature, air temperature, and electric heat temperature, among others. The actuator 312, and/or the actuator enclosed-resistor 301, and/or constriction ring 314 can compress in response to the temperature. For example, the actuator 312, and/or actuator enclosed-resistor 312, and/or constriction ring 314 can compress when the temperature sensors 315 detect a change in temperature, such as warm air.

The lockable connector device 300 can include a controller. The controller (not shown) can be connected (e.g., communicatively coupled) to the actuator 312. Such a connection can allow signals and/or data to be sent in any direction between temperature sensor and controller as well as between controller and actuator 312. For example, the controller can cause an actuation of actuator 312 such that the synthetic muscles and/or appendages 308 compress (e.g., the controller can cause an actuation of compression, e.g., locking).

The controller can include logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Controller can be and/or include a computing device configured to execute instructions instead of, or in addition to, logic. A controller can be connected to the temperature sensors and be coupled to an actuator 312 and/or actuator enclosed-resistor 301, and/or constriction ring 314. The controller can control the compression of the synthetic muscles via the actuator 312, actuator enclosed-resistor 301, and/or constriction ring 314, which can lock the spherical bodies 302, 310 into a position.

In some examples, the lockable connector device 300 can include a strain gauge to determine a force or weight threshold limitation. Determination of a force or weight threshold limitation can prevent damage to the lockable connector device, object, and/or tool. That is, depending on the particular task, different force thresholds may be determined. In a number of examples, the lockable connector device 300 can include an LCD display and an audible alarm. The audible alarm can indicate a force or weight threshold limitation. For example, the audible alarm may sound if the lockable connector device 300 applies an amount of force that can damage the grasped tool, object, and/or the lockable connector device 300.

Figure 4:
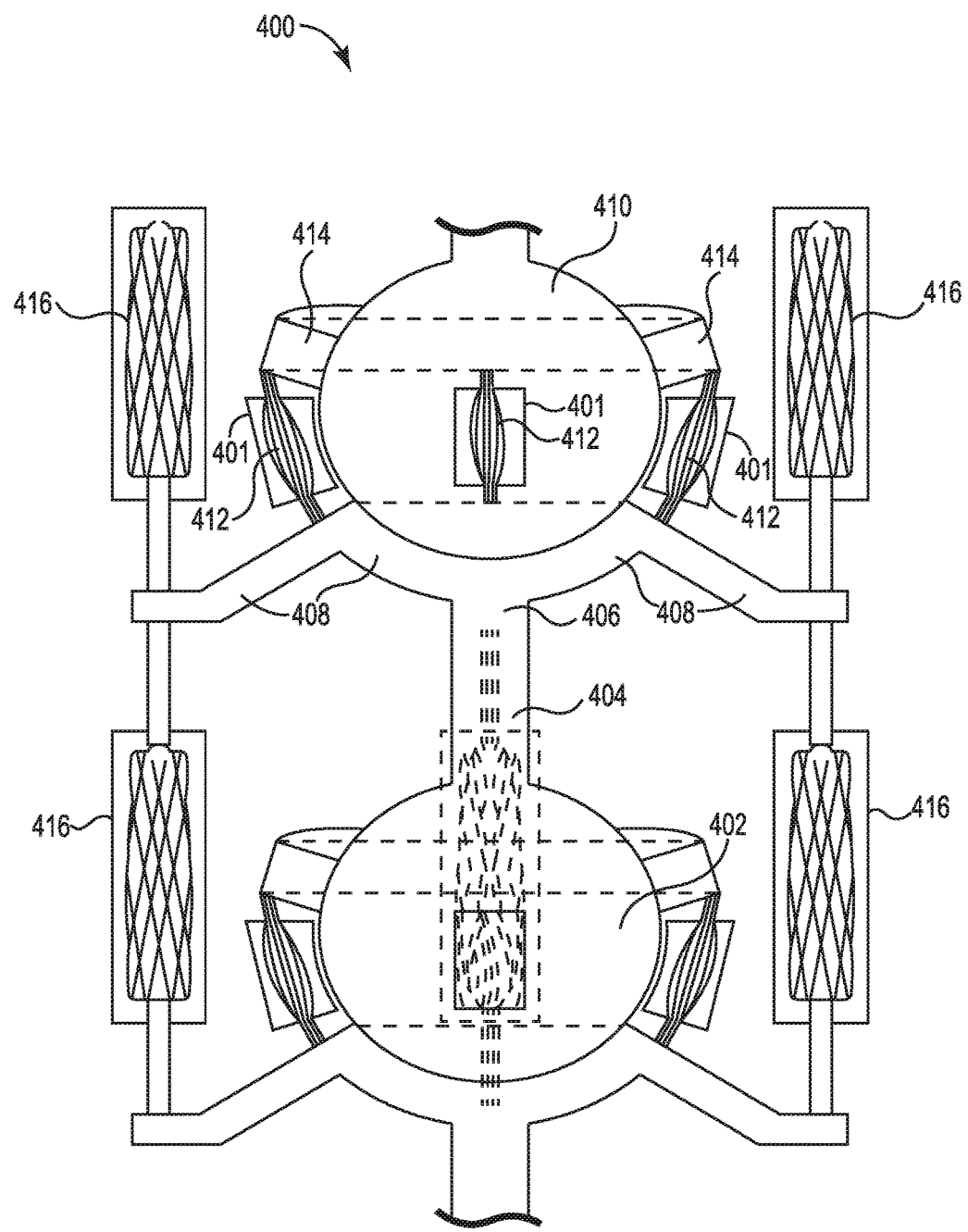
FIG. 4 illustrates a use diagram of an example lockable connector device for operating a lockable connector device according to the present disclosure.

FIG. 4 illustrates a use diagram of an example lockable connector device for operating a lockable connector device according to the present disclosure. FIG. 1 depicts a system of lockable connectors 400 that can include a first spherical body 402 connected to a shaft, where the shaft provides connection to a first spherical body at a first end of the shaft 404. A plurality of appendages connected to a second end of a shaft 406, where the appendages partially encase a first portion of a second spherical body 410 and a constriction ring 414 to encircle a second portion of the second spherical body. FIG. 1 also includes an actuator 412 connected to the appendages and constriction ring 414, where the actuator can be made up of synthetic muscles that cause the appendages and constriction ring 414 to compress and lock the second spherical body 410 into a position.

In some examples, the synthetic muscles (e.g., actuator 412, actuator enclosed-resistor 401) can be actuated to compress via heat. Synthetic muscle compression can be actuated via water heat, air heat, electric heat, and applied heat, among other examples. That is, the synthetic muscles can compress in response to a change from a cooler temperature to a warmer temperature. The amount of heat can vary depending on the type of use the system of lockable connectors 400 is engaged. For example, if the system of lockable connectors is engaged in liquid work, appendage compression can be in response to water temperature.

In a number of examples, the constriction ring 414 can be rigid so as to hinder movement. The constriction ring 414 can compress in conjunction with the synthetic muscles (e.g., actuator 412, actuator enclosed-resistor 401) and appendages 408 can lock the second spherical body 402 into a fixed position. The dual compression points (e.g., actuator 412 and constriction ring 414) can afford stability to the lockable connector device system 400.

FIG. 4 also includes a depiction of extended appendages 408. The extended appendages 408 can connect to a large outer actuator 416. That is, the large outer actuator 416 can include large synthetic muscles, which in turn provide additional force. The larger outer actuator 416 can function analogous to the actuator enclosed-resistor described in FIG. 3, and analogous element 401 depicted in FIG. 4. The additional force and/or strength of the lockable connector system can, in some examples, engage in tasks that require additional strength, force, torque, objects, and/or tools, among other instances.

The large outer actuator 416 can be arranged around the periphery, such as radially, of the first and second spherical bodies 402, 410 and shaft 404, 406. However, the large outer actuators 416 can, in some examples, be arranged in the in-between spaces of the spherical bodies 402, 410 and shaft 404, 406. The large outer actuator 416 can be distanced away from the core of the lockable connector system 400, such that there can be as many appendages 408 and constrictive elements (e.g., constrictive ring 414, actuator 412, etc.) as desired. The anchor points of the synthetic muscles can be distanced and spaced such that the actuated (compressed) synthetic muscles do not interfere with related lockable connector system 400 elements.

Alternative examples of the lockable connector device and/or system can include electromagnets in place of the synthetic muscles. The electromagnets can be a magnet that can create a magnetic field that is produced by an electrical current. Use of electromagnetics can prevent and/or decrease "thermal lag." Thermal lag can be the time that is required to add or remove heat from the lockable connector device and/or use before achieving the set-point temperature. That is, the slow-cooling electromagnets can enable a locking function of the appendages that decreases thermal lag, which can increase and/or decrease the time to actuate the compression or decompression. In some examples, the electromagnets can be turned on and/or off manually or automatically.

In a number of examples, the electromagnets can be a number or electromagnets and/or a large single electromagnet embedded on the inside of the shaft. Additionally, and/or alternatively, the electromagnets can be embedded on the appendages. The spherical bodies of the lockable connector device/system can be made from ferromagnetic materials. The combination of electromagnets and ferromagnetic materials can create magnetism for the lockable connector device.

In some examples, variable DC power from the electromagnets can provide variable compression (e.g., locking, stiffness) for the lockable connector device. For example, using the electromagnets can enable various levels of compression. That is, different level of connector "locking" can exist. In a number of examples, each lockable connector (e.g., each segment of the lockable connector device) can be separately controlled. For instance, a connector that grasps an object can be compressed at a maximum level. Conversely, a different connector located further from the grasping connector can be compressed at an intermediate level. The electromagnets can provide a minimal level of force that can keep the lockable connector device together, but yet enables a user or position and/or re-position the device with ease.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

The specification examples provide a description of the applications and use of the devices and system of the present disclosure. Since many examples can be made without departing from the spirit and scope of the system and method of the present disclosure, this specification sets forth some of the many possible example configurations and implementations.

As used herein, "a" or "a number of" something can refer to one or more such things. For example, "a number of widgets" can refer to one or more widgets.

What is claimed:

1. A lockable connector device comprising:
a first spherical body connected to a first end of a shaft;
a plurality of flexible appendages connected to a second end of the shaft, wherein the appendages partially encase a second spherical body;
a resistor-enclosed actuator connected to the appendages; and
a flexible constriction ring attached to the resistor-enclosed actuator, wherein the actuator is comprised of synthetic muscles that constrict the flexible constriction ring to lock the second spherical body.

2. The device of claim 1, wherein the synthetic muscles compress based on temperature change.

3. The device of claim 2, further comprising:
a sleeve encasement over the synthetic muscles; and
spaced air inlet vents within the sleeve encasement.

4. The device of claim 1, wherein the appendages partially encase less than half of the second spherical body.

5. The device of claim 1, wherein the appendages are spaced apart such that each appendage from among the plurality of appendages are not in contact.

6. The device of claim 1, wherein the second spherical body rotates freely when the flexible constriction ring is not constricted.

7. The device of claim 1, wherein a number of resistors are attached to the actuator to provide an electrical supply.

8. The device of claim 1, wherein the actuator is comprised of twisted monofilament string.

9. A lockable connector device comprising:
a first spherical body connected to a first end of a shaft;
a resistor-enclosed actuator connected to a second end of the shaft; and
a flexible constriction ring attached to the resistor-enclosed actuator, wherein the actuator constricts the resistor-enclosed and constriction ring to lock a second spherical body.

10. The device of claim 9, further comprising a number of temperature sensors attached to an appendage to monitor temperature changes.

11. The device of claim 9, further comprising a strain gauge to determine a force or weight threshold limitation.

12. The device of claim 9, further comprising an LCD display and an audible alarm.

13. A system of lockable connectors, comprising:
a first spherical body connected to a shaft, wherein the shaft provides connection to a first spherical body at a first end of the shaft;
a plurality of appendages connected to a second end of a shaft, wherein the appendages partially encase a first portion of a second spherical body; and
a constriction ring to encircle a second portion of the second spherical body;
an actuator connected to the appendages and constriction ring, wherein the actuator is comprised of synthetic muscles that cause the appendages and constriction ring to compress and lock the second spherical body into a position.

14. The system of claim 13, wherein the synthetic muscles are actuated to compress via heat.

15. The system of claim 14, wherein the constriction ring is rigid to hinder movement.

* * * * *